Patented Feb. 9, 1954

2,668,818

UNITED STATES PATENT OFFICE 2,668,818

S-(ETHYLXANTHOYL) METHANETHIOL-PHOSPHONIC CHLORIDE

Henry Tolkmith, Midland, Mich., assignor to The Dow Chemical Company, Midland, Mich., a corporation of Delaware No Drawing. Application April 21, 1953, Serial No. 350,231

1 Claim. (Cl. 260—455)

The present invention is directed to S-(ethylxanthoyl) methanethiolphosphonic chloride of the formula

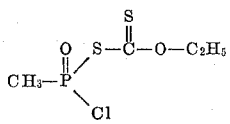

This compound is a viscous oil, somewhat soluble in many organic solvents and substantially insoluble in water. It is of value as an intermediate for the preparation of more complex phosphorus derivatives and as a toxic constituent of parasiticide compositions.

The new compound may be prepared by reacting one molecular proportion of an alkali metal ethylxanthate with one molecular proportion of methanephosphonic dichloride of the formula

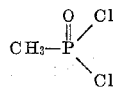

in an inert organic solvent such as benzene. In practice, sodium ethylxanthate is preferably employed as the alkali metal xanthate reactant.

In carrying out the reaction, the sodium ethylxanthate is added with stirring to the methanephosphonic dichloride dispersed in the solvent and the resulting mixture heated for a period of time at a temperature of from 35° to 80° C. Since the desired product has a tendency to decompose at temperatures in excess of 80° C., reaction temperatures substantially in excess of 80° C. for any appreciable period of time should be avoided. Upon completion of the reaction the mixture may be filtered and the filtrate distilled under reduced pressure at gradually increasing temperatures up to a temperature of 80° C. to separate low boiling constituents and to obtain as a residue the desired S-(ethylxanthoyl) methanethiolphosphonic chloride.

In a representative preparation, 21.7 grams (0.15 mole) of sodium ethylxanthate was added with stirring to 20 grams (0.15 mole) of methanephosphonic dichloride (boiling at 163° C. at atmospheric pressure) in 100 milliliters of benzene and the mixture thereafter heated for 2 hours at a temperature of 55° C. At the end of this period the mixture was filtered and the filtrate concentrated by distillation under reduced pressure to a temperature up to 60° C. to obtain as a residue an S-(ethylxanthoyl) methanethiolphosphonic chloride product. The latter is a viscous oil having a density of 1.245 at 20° C.

The new S-(ethylxanthoyl) methanethiolphosphonic chloride product is effective as a parasiticide and adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture.

In representative operations against flies and cockroaches, 100 percent kills of these pests are obtained with dust compositions containing 4.5 percent by weight of the toxic methanethiolphosphonic chloride.

This is a continuation in part of my copending application Serial No. 203,759, filed December 30, 1950.

I claim:

S - (ethylxanthoyl) methanethiolphosphonic chloride.

HENRY TOLKMITH.

No references cited.